W. E. SHERWOOD.
VELOCIPEDE.
APPLICATION FILED FEB. 28, 1918.
1,308,377.
Patented July 1, 1919.
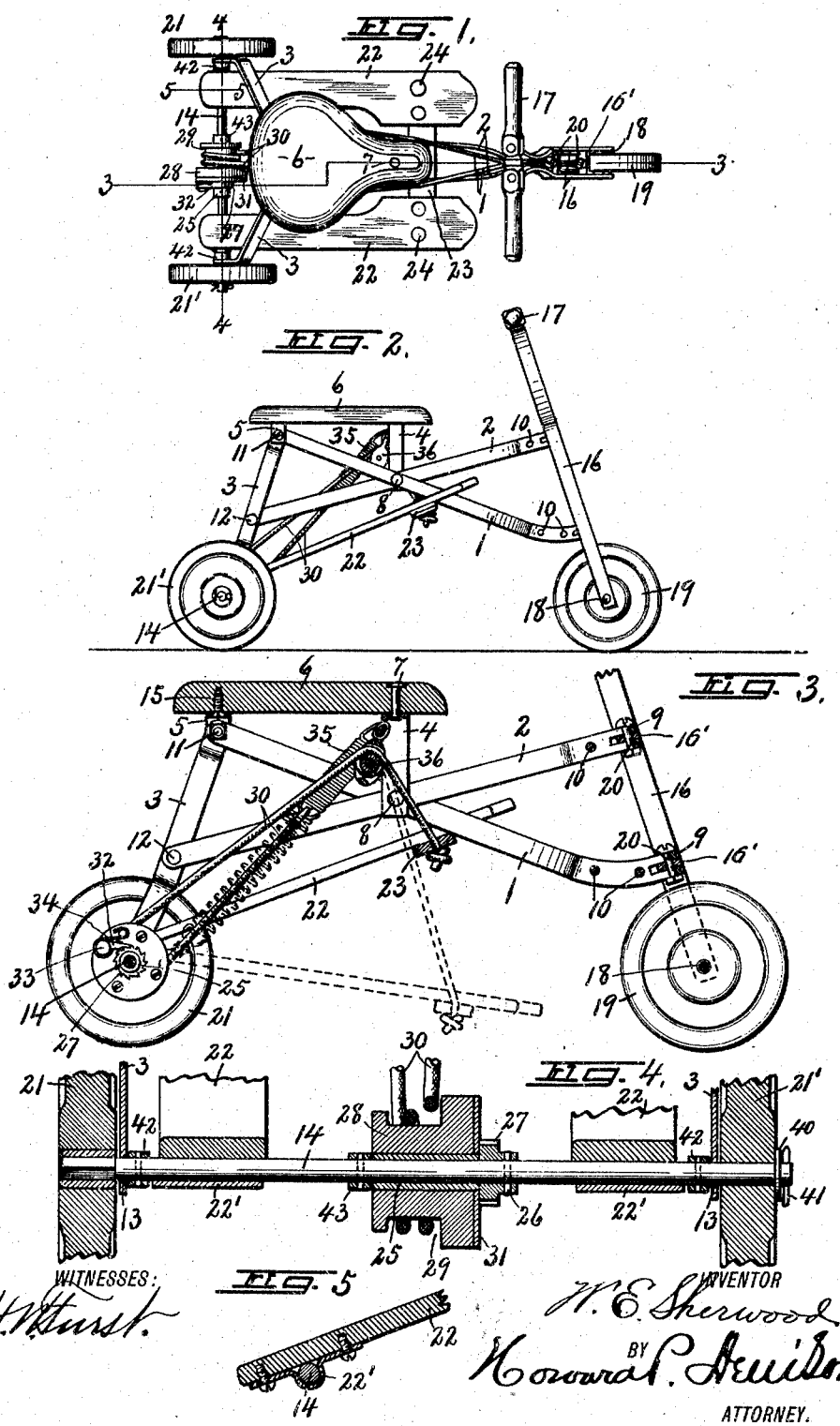

UNITED STATES PATENT OFFICE.

WILLIAM E. SHERWOOD, OF CANASTOTA, NEW YORK.

VELOCIPEDE.

1,308,377.	Specification of Letters Patent.	Patented July 1, 1919.

Application filed February 28, 1918. Serial No. 219,630.

*To all whom it may concern:*

Be it known that I, WILLIAM E. SHERWOOD, a citizen of the United States of America, and resident of Canastota, in the county of Madison, in the State of New York, have invented new and useful Improvements in Velocipedes, of which the following, taken in connection with the accompanying drawings, is a full, clear, and exact description.

This invention relates to certain improvements in velocipedes, preferably of the tricycle type, for children's use and adapted to be propelled by the rider through the medium of suitable pedals and special connections between said pedals and the rear axle.

The main object is to produce a device of this character which is light, strong and durable, and capable of being manufactured at a comparatively small cost.

Another object is to provide a simple, but highly efficient means for transmitting motion from the pedals to the rear axle so that it may be easily and quickly installed and replaced when impaired and will, at the same time, permit coasting without operating the pedals.

Other objects and uses relating to specific parts of the device will be brought out in the following description.

In the drawings—

Figures 1 and 2 are, respectively, a top plan and a side elevation of a tricycle embodying the features of my invention.

Fig. 3 is an enlarged longitudinal vertical sectional view taken on line 3—3, Fig. 1.

Fig. 4 is an enlarged transverse sectional view taken on line 4—4, Fig. 1.

Fig. 5 is a detail sectional view of the connection between one of the pedals and rear axle, taken on line 5—5, Fig. 1.

As illustrated, the frame of the machine comprises a pair of V-shaped bars —1— and —2—, a front fork, a pair of rear bars —3— and a pair of U-shape seat-supporting bars —4— and —5— to which is secured a suitable seat —6—, all of which elements except the seat are preferably made of comparatively light strap iron commonly carried in stock by hardware dealers and metal workers, the seat being preferably made of wood in the usual saddle form.

The frame bars —1— and —2— extend longitudinally of the machine in intersecting planes so that their arms at corresponding sides may cross each other directly under the horn or front end of the saddle to which the upper portion of the U-shape bar —4— is secured by bolts —7—, thus permitting the opposite pendent arms of the bar —4— and adjacent intersecting portions of the opposite arms of the lengthwise bars —1— and —2— to be secured together by the same rivets or bolts —8—.

The opposite arms of each of the bars —1— and —2— converge forwardly and are integrally united at their front ends to form an eye —9—, the portions thereof just at the rear of the eye being secured together by rivets or bolts —10—.

The remaining portions of the arms of the bar —1— diverge rearwardly in the same inclined plane and together with the upper ends of the rear frame bars —3— are secured to the opposite pendent arms of the cross bar —5— by bolts —11—.

The opposite arms of the lengthwise bar —2— also diverge rearwardly and their rear ends are secured by bolts —12— to the rear brace bars —3— at corresponding sides of the frame, thus producing what may be termed a truss frame.

The rear brace bars —3— diverge downwardly from the opposite ends of the cross bar —5— and are provided with apertures —13— for receiving and supporting the opposite ends of a revoluble rear axle —14—.

The rear end or main body of the seat —6— is secured by bolts or screws —15— to the rear cross bar —5— and constitutes a rigid connection between the cross bars —4— and —5— to hold them in fixed relation to each other and to the frame bars —1—, —2— and —3—.

The steering post or front fork, as —16—, preferably consists of a pair of similar sheet metal bars in spaced relation having their upper ends secured to a handle bar —17— and their lower ends apertured for receiving and supporting a front axle —18— carrying a steering wheel —19— between said bars.

The eyes —9— on the front ends of the lengthwise bars —1— and —2— are coaxial and disposed in a plane inclining rearwardly from a vertical and are preferably bifurcated or slotted lengthwise to receive U-shape cross bars 16' which are secured to and between the opposite upright bars —16— of the steering fork, said cross bars being provided with apertures registering with the eye —9— for receiving pivotal bolts —20— by which the steering post or fork is connected to the frame bars —1— and —2— for lateral turning movement.

Mounted upon the opposite ends of the rear axle —14— are suitable wheels —21— and —21'—, one of which, as —21—, is secured to the axle to rotate therewith, while the other wheel —21'— is loose thereon to compensate for varying speeds of travel of the wheels in turning corners.

Propelling mechanism.

The means for propelling the machine preferably comprises a pair of oppositely disposed pedals —22— having their rear ends hinged to the rear axle —14— and their front ends connected by a cross bar —23— secured thereto by bolts or rivets —24— so as to cause both pedals to operate in unison, said pedals being located at opposite sides of and some distance below the front portion of the seat or saddle —6— so as to allow both feet of the operator to rest easily on the front ends thereof when sitting on the saddle.

A sleeve —25— is secured by a key —26— to the central portion of the rear axle —14— substantially midway between the rear ends of the pedals —22— and is provided near one end with a ratchet wheel —27—.

A drum —28— is loosely journaled upon the periphery of the sleeve —25— close to the ratchet wheel —27— and is preferably made of wood and provided with an annular groove —29— in its periphery for receiving cable —30—, the end of the drum adjacent the ratchet wheel —27— being reinforced by a circular metal plate —31— secured thereto and forming a convenient support for a pawl —32— which is pivoted at —33— to said drum and its free end is yieldingly held in engagement with the ratchet teeth by means of a spring —34—.

The cable —30— is wound one or more turns around and upon the periphery of the drum —28— and has one end connected to one end of a retracting spring —35—, the other end of which is attached to the front cross bar —4— directly under the seat, as shown more clearly in Fig. 3.

The opposite end of the cable is passed over a swinging sheave —36— and attached to the central portion of the cross bar —23— which connects the front ends of the pedals —22—, the frame of the sheave —36— being attached to the front seat-supporting bar —4—.

The upward swinging movement of the pedals is limited by the engagement of their connecting bar —23— with the under side of the lengthwise bar —1—.

The spring —35— is adjusted to normally tighten the cable on the drum when the pedals are at the limit of their upward movement so that when the front ends of the pedals are depressed by the operator, the spring will be distended and its tension gradually increased, thereby increasing the grip of the cable upon the drum to increase the propelling power, during which the pawl —32— engages and rotates the ratchet wheel —27—, thereby transmitting similar rotary motion to the axle —14— and to the traction wheel —21— for propelling the machine forwardly.

As soon as the downward pressure upon the pedals is relieved, the spring —35— acting through the cable —30— returns the pedals to their normal position and incidentally rotates the drum in the reverse direction from that produced by the downward movement of the pedals, thereby causing the pawl —32— to ride over the teeth of the ratchet wheel, thus allowing the machine to coast while the pedals remain at rest, either in their normal position or any other position in which they may be held by the operator The pedals —22— are preferably made of wood of light weight, the rear ends thereof resting upon the upper side of the axle —14—, to which they are hingedly connected by metal straps or plates —22'— extending around the under side of the axle and having their opposite ends secured to the under sides of the adjacent portion of the pedals.

The wheels —21— and —21'— may be held upon the ends of the axle —14— against endwise displacement therefrom by any suitable means, such as upsetting the end of the axle on which the traction wheel is mounted and employing a washer —40— and cotter key —41—, Fig. 4.

The lower ends of the brace bars —3— are located just inside of the wheels —21— and —21'— and serve to prevent inward axial movement of said wheels along the axle, the adjacent ends of the brace bars being held against spring inwardly by collars —42— which are secured to the axle and also serve to hold the adjacent ends of the pedals against undue axial movement.

A similar collar —43— is secured to the axle —14— at the end of the drum —28— opposite that at which the ratchet wheel —27— is located to cooperate with the ratchet wheel in holding the drum against axial movement.

What I claim is:

1. A tricycle comprising front and rear axles, a steering wheel on the front axle, traction wheels on the rear axle, a front fork supporting the front axle, brace-bars supporting the rear axle, lower and upper cross-bars secured to and between the opposite arms of the front fork, lengthwise bars crossing each other between the axles and having their front ends pivoted to said cross bars respectively and their rear ends secured to the rear brace bars, seat supports secured to said lengthwise bars and braces respectively, a seat mounted on said supports, and pedal operated means for driving the rear axle.

2. In a tricycle, the combination of a front steering fork having means for supporting a steering wheel, rear braces having means for supporting traction wheels, and lengthwise frame bars, having their front ends pivotally supported between the arms of the steering fork and their rear ends secured to the braces.

3. In a tricycle, the combination of a front steering fork having means for supporting a steering wheel, rear braces having means for supporting traction wheels, and lengthwise frame bars, crossing each other between the fork and braces and secured together at their crossing, and cross bars secured to and between the opposite arms of the fork and pivotally connected to the front ends of said frame bars, the rear ends of the frame bars being secured to said braces.

4. In a velocipede of the character described, the combination of a frame having lengthwise bars disposed in intersecting planes, each bar having rearwardly diverging arms, the arms of both bars at each side of the frame being secured at their intersections with a seat-supporting bar, the rear brace bars secured to the rear ends of the lengthwise bars, a seat mounted on the frame, a steering post mounted on the front end of the lengthwise bars to turn laterally, a steering wheel mounted on the lower end of the post, a driving axle journaled in the lower ends of the rear brace bars and provided with a traction wheel, pedals hinged to the rear axle and extending forwardly therefrom, a cross bar connecting the front ends of the pedals, a drum loosely mounted on the axle, ratchet and pawl connections between the drum and axle, a sheave and a spring both mounted on the frame above the pedals and beneath the seat, and a cable wound one or more turns around the drum and having one end passed over the sheave and attached to the cross bar of the pedals and its other end attached to the spring.

In witness whereof I have hereunto set my hand this 16th day of February, 1918.

WILLIAM E. SHERWOOD.

Witnesses:
H. E. CHASE,
ALICE M. CANNON.

Copies of this patent may be obtained for five cents each, by addressing the "Commissioner of Patents, Washington, D. C."